United States Patent Office 3,099,662
Patented July 30, 1963

3,099,662
DIOXASPIRO DERIVATIVES
Burton K. Wasson, Valois, Quebec, and John M. Parker, Montreal, Quebec, Canada, assignors to Charles E. Frosst & Co., Montreal, Quebec, Canada, a corporation of Quebec, Canada
No Drawing. Filed May 4, 1962, Ser. No. 192,333
5 Claims. (Cl. 260—345.9)

This invention relates to novel dioxaspiro derivatives, and a process for the manufacture thereof. More particularly, this invention relates to dioxaspiro compounds of the formula:

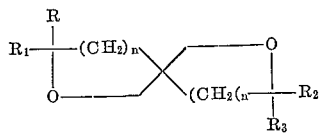

wherein $n$ represents either 1 or 2, and R, $R_1$, $R_2$, and $R_3$ represent hydrogen or a lower alkyl radical from 1 to 3 carbon atoms. Those skilled in the art will appreciate that when $n$ is 1 the product will be a dioxaspirononane, and when $n$ is 1 and 2 the product will be a dioxaspirodecane and when $n$ is 2 the product will be dioxaspiroundecane.

The products of this invention are prepared by the reduction of a suitable di-unsaturated malonate with lithium aluminum hydride to give the corresponding di-unsaturated 1,3-propanediol, followed by cyclization of the diol using catalytic amounts of a mineral acid to give the corresponding dioxaspiro derivative. For example, reduction of diethyl dimethallylmalonate with lithium aluminum hydride followed by cyclization of the 2,2-dimethallyl-1,3-propanediol gave the product 3,3,8,8-tetramethyl-2,7-dioxaspiro(4.4)nonane.

On the other hand, a similar reduction of diethyl methallyl-3-methyl-2-butenyl)malonate followed by cyclization of the 2-methallyl-2(3-methyl-2-butenyl)-1,3-propanediol gave 3,3,8,8-tetramethyl-2,7-dioxaspiro(4.5) decane. Likewise, the above mentioned reaction sequence when applied to diethyl di-(3-methyl-2-butenyl)malonate can give 3,3,9,9-tetramethyl-2,8-dioxaspiro(5.5)undecane.

3,3,8-trimethyl-2,7-dioxaspiro(4.4)nonane was prepared by treatment of 2,2-dimethyl-4-allyl-4-hydroxymethyltetrahydrofuran heated on the steam bath in the presence of 10% (by weight) concentrated hydrochloric acid. These conditions were also effective in the ring closure of 2-allyl-2-methallyl-1,3-propanediol to give the same product.

The compounds to which the invention relates are useful because of their valuable pharmacological properties. Thus, for example, they exhibit anti-convulsant properties when tested by audiogenic seizures using a strain of susceptible mice. For example, it has been found that the anti-convulsant dose of 3,3,8-trimethyl-2,7-dioxaspiro(4.4)nonane is substantially lower than the lethal dose, and that the $LD_{50}$ is 340 mg./kg. and that the anti-convulsant $D_{50}$ is 75 mg./kg.

EXAMPLE 1

3,3,8,8-Tetramethyl-2,7-Dioxaspiro(4.4)Nonane (a) A solution of 214.5 g. of diethyl dimethallylmalonate in 500 ml. of anhydrous ethyl ether was added dropwise over a 4 hour period to a vigorously stirred mixture of 45.6 g. of lithium aluminum hydride and 1250 ml. of anhydrous ethyl ether maintained at 5–20° C. The reaction mixture was stirred for 2 hours. The mixture was cooled, and decomposed by successive addition of methanol-ethyl ether, methanol-water, and water. The solids were triturated several times with ethyl ether and the combined ethereal extracts were washed with water and evaporated to dryness to give an oily product. Distillation of this oil afforded 136.5 g. of 2,2-dimethallyl-1,3-propanediol, B.P. 162.5–172.0° C./15–20 mm. Infrared: λ max. 3.0 (hydroxyl), 3.25, 6.1 (unsaturation), 9.6–9.8 (hydroxyl), 11.25μ (methallyl).

(b) 2,2-dimethallyl-1,3-propanediol (83.9 g.) was dissolved in 59.5 ml. of tetrahydrofuran and treated with 1.9 ml. of concentrated hydrochloric acid. The internal temperature of the solution rose spontaneously to 60° C. and was cooled briefly, left 1 hour at room temperature, and refluxed for a period of two hours. The tetrahydrofuran was removed by distillation. The residue was dissolved in ethyl ether, washed with small amounts of dilute alkali to remove any acid, washed with water, dried, and evaporated to give 73.7 g. of a pale yellow liquid. Distillation of this product afforded 68.3 g. of 3,3,8,8-tetramethyl-2,7-dioxaspiro(4.4)nonane, B.P. 115–121° C./21 mm. An analytical sample of 3,3,8,8-tetramethyl-2,7-dioxaspiro(4.4)nonane was obtained by redistillation through a spinning band column having B.P. 109–110° C./30–31 mm., $n_D^{25}$ 1.4404. Another specimen had a B.P. of 207.5–208° C./760 mm.

Analysis.—Calc. for $C_{11}H_{20}O_2$: C, 71.69; H, 10.94. Found: C, 72.05, 72.13; H, 11.43, 11.19.

The infrared spectrum of 3,3,8,8-tetramethyl-2,7-dioxaspiro(4.4)nonane indicated the absence of unsaturation and of hydroxyl groups and the appearance of an additional band in the methyl region.

EXAMPLE 2

3,3,8-Trimethyl-2,7-Dioxaspiro(4.4)Nonane 2,2-dimethyl - 4 - allyl-4-hydroxymethyltetrahydrofuran (25 g.) was treated dropwise with 6.5 ml. of concentrated hydrochloric acid. The internal temperature of the solution rose from 25° C. to 35° C. accompanied by faint discoloration. The solution was left 30 minutes at room temperature and then warmed overnight on a steam bath. Concentrated sodium hydroxide (containing 4 g. of sodium hydroxide) was added to the solution maintained at 15–25° C. and the mixture was extracted with ethyl ether. The ethereal solution was washed with water and the ether distilled to give 23 g. of a liquid. This liquid was distilled to afford 20.8 g. of 3,3,8-trimethyl-2,7-dioxaspiro(4.4)nonane, B.P. 68–74° C./6–8 mm., $n_D^{25}$ 1.4439. The analytical specimen obtained by fractional distillation on a spinning band column had B.P. 70.5–71.0° C./6 mm., $n_D^{25}$ 1.4436.

Analysis.—Calc. for $C_{10}H_{18}O_2$: C, 70.55; H, 10.66. Found: C, 70.29; H, 10.64.

The infrared spectrum of 3,3,8-trimethyl-2,7-dioxaspiro (4.4)nonane showed the appearance of a second band in the methyl region and the disappearance of bands associated with unsaturation and hydroxyl groups.

EXAMPLE 3

3,3,8-Trimethyl-2,7-Dioxaspiro(4.4)Nonane 2-allyl-2-methallyl-1,3-propanediol (25 g.) was treated at room temperature with 6.5 ml. of concentrated hydrochloric acid. The internal temperature rose rapidly and reached 80° C. even with external cooling. The material was warmed 7 hours on the steam bath, made basic by the addition of 6 N sodium hydroxide, and extracted with ethyl ether. The ether was removed and the residue distilled to give 20.2 g. of 3,3,8-trimethyl-2,7-dioxaspiro (4.4)-nonane, B.P. 77–83° C./8–10 mm., $n_D^{25}$ 1.4438. The infrared spectrum of this product was identical within experimental error with that of the product from Example 2.

EXAMPLE 4

3,3,8,8-Tetramethyl-2,7-Dioxaspiro(4.5)Decane (a) Diethyl methallylmalonate (110.2 g.) was added during 5–10 minutes to a solution of sodium ethoxide (from 11.9 g. of sodium in 300 ml. of ethanol). The mixture was stirred for 30 minutes and 76.7 g. of 3-methyl-2-butenyl bromide was added during 20 minutes of stirring. The mixture was refluxed overnight, cooled to room temperature, and treated with water to dissolve the sodium chloride. The solution was slightly acidic. The ethanol was removed in vacuo and the residual mixture extracted with ethyl ether. The combined ethereal extracts were washed sparingly with water and the ether evaporated to give 139.2 g. of oily product. Distillation of this product afforded 14 g. of forerun, B.P. 72–123° C./11 mm., $n_D^{25}$ 1.4495; 121.8 g. of diethyl methallyl(3-methyl-2-butenyl)-malonate, B.P. 121–162° C./11 mm., $n_D^{25}$ 1.4566: and 1.8 g. of residue. Further distillation afforded an analytical specimen of diethyl methallyl(3-methyl-2-butenyl)malonate, B.P. 149–150° C./14 mm., $n_D^{25}$ 1.4571.

*Analysis.*—Calc. for $C_{16}H_{26}O_4$: C, 68.05: H, 9.28. Found: C, 67.67, H, 9.14.

Infrared: λ max. 3.25 (unsaturation), 5.75 (carbonyl), 6.1 (unsaturation), 7.25–7.32 (methyl), 8.3–8.5 (ester) and 11.15μ (methallyl). By proceeding in a similar manner diethyl(3-methyl-2-butenyl)-malonate would give diethyl di-(3-methyl-2-butenyl)malonate.

(b) Diethyl methallyl(3-methyl-2-butenyl)malonate (99.1 g.) was dissolved in 300 ml. of anhydrous ethyl ether and then added dropwise during 2 hours to 20 g. of lithium aluminum hydride slurried in 500 ml. anhydrous ethyl ether maintained at 10–20° C. The mixture was stirred during 1 hour with the temperature rising to 25° C. and left at room temperature overnight. The mixture was cooled with an ice-salt bath and decomposed by the successive addition of methanol-ethyl ether, methanol-water, and water. The solids were collected, washed repeatedly with ether, the ethereal extracts combined, washed, and evaporated to give 67.3 g. of an oil. Distillation of this oil at 148–165° C./9 mm. afforded 65.6 g. of semipure 2-methallyl-2-(3-methyl-2-butenyl)-1,3-propanediol. The distillate upon standing crystallized with evolution of heat affording white needles, M.P. 54.5–55.0° C.

*Analysis.*—Calc. for $C_{12}H_{22}O_2$: C, 72.68, H, 11.18. Found: C, 72.74, H, 11.22.

Infrared: λ max. 3.0 (hydroxyl), 3.22, 6.1 (unsaturation), 6.9 ($CH_2$), 7.25 (methyl), 9.5–9.8 (hydroxyl), 11.25μ (methallyl). By proceeding in a similar manner diethyl di-(3-methyl-2-butenyl)malonate would give 2,2-di-(3-methyl-2-butenyl)-1,3-propanediol.

(c) 2-methallyl-2-(3-methyl-2-butenyl)-1,3-propanediol (30 g.) in 110 ml. of tetrahydrofuran was treated dropwise during 15 minutes with 28 ml. 6 N hydrochloric acid accompanied by stirring. The internal temperature of the solution rose from 22° to 33° C. The solution was refluxed for 3 hours and the tetrahydrofuran distilled at atmospheric pressure to give 31.9 g. of crude 3,3,8,8-tetramethyl-2,7-dioxaspiro(4.5)decane. Distillation of this material through a spinning-band column afforded an analytical sample of 3,3,8,8-tetramethyl-2,7-dioxaspiro(4.5) decane, B.P. 94.0–94.5° C./6 mm., $n_D^{25}$ 1.4505.

*Analysis.*—Calc. for $C_{12}H_{22}O_2$: C, 72.68, H, 11.18. Found: C, 72.66, 72.72, H, 11.14, 11.24.

The infrared spectrum indicated the absence of unsaturation and hydroxyl groups and the presence of methyl groups (7.25, 7.35μ). By proceeding in a similar manner 2,2-di-(3-methyl-2-butenyl)-1,3-propanediol would give 3,3,9,9-tetramethyl-2,8-dioxaspiro(5.5)undecane.

What we claim is:
1. 3,3,8,8-tetramethyl-2,7-dioxaspiro(4.4)nonane.
2. 3,3,8-trimethyl-2,7-dioxaspiro(4.4)nonane.
3. 3,3,8,8-tetramethyl-2,7-dioxaspiro(4.5)decane.
4. 3,3,9,9-tetramethyl-2,8-dioxaspiro(5.5)undecane.
5.

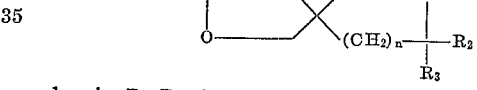

wherein R, $R_1$, $R_2$ and $R_3$ are selected from the group consisting of hydrogen and lower alkyl radicals having from 1 to 3 carbon atoms, at least one of R, $R_1$, $R_2$ and $R_3$ is alkyl and $n$ is a positive integer from 1 to 2.

References Cited in the file of this patent

Patterson et al.: The Ring Index, 2nd ed., pp. 134 and 222, Amer. Chem. Soc. (1960), QD 291.P3.

Chemical Abstracts, 5th Decennial Index, vols. 41–50, subject index, Cy-Ey, pp. 4230s–4231s (1947–1956), QD 1.A51.